United States Patent [19]

Cahuzac

[11] Patent Number: 5,390,707
[45] Date of Patent: Feb. 21, 1995

[54] METHOD AND A MACHINE FOR MAKING HOLLOW REINFORCING MEMBERS

[75] Inventor: Georges J. J. Cahuzac, Le Bouscat, France

[73] Assignee: Societe Nationale Industrielle et Aerospatiale, Paris, France

[21] Appl. No.: 162,938

[22] Filed: Dec. 8, 1993

Related U.S. Application Data

[63] Continuation-in-part of Ser. No. 951,829, Sep. 28, 1992, abandoned.

[30] Foreign Application Priority Data

Oct. 3, 1991 [FR] France .................. 91 12169

[51] Int. Cl.⁶ .................. D03D 47/04; D03D 13/00; D03D 37/00
[52] U.S. Cl. .................. 139/11; 66/13; 139/457
[58] Field of Search .................. 66/13, 125 R, 10; 264/103, 257; 156/173, 175; 242/7.21; 139/457, 11, DIG. 1; 28/140, 142, 151, 152

[56] References Cited

U.S. PATENT DOCUMENTS

| | | |
|---|---|---|
| 2,283,802 | 5/1942 | Gingher . |
| 3,242,698 | 3/1966 | Marks et al. . |
| 3,322,868 | 5/1967 | Kruse et al. . |
| 4,080,915 | 3/1978 | Bompard et al. . |
| 4,492,096 | 1/1985 | Cahuzac . |
| 4,805,421 | 2/1989 | Cahuzac . |
| 4,805,422 | 2/1989 | Cahuzac . |
| 4,863,660 | 9/1989 | Cahuzac et al. . |
| 4,920,767 | 5/1990 | Plath et al. . |
| 4,938,270 | 7/1990 | Fukuta et al. . |

FOREIGN PATENT DOCUMENTS

| | | |
|---|---|---|
| 2227748 | 11/1974 | France . |
| 2395340 | 1/1979 | France . |
| 2529589 | 1/1984 | France . |
| 2531459 | 2/1984 | France . |
| 0281446 | 2/1988 | France . |
| 3819708 | 12/1988 | Germany . |

*Primary Examiner*—Andrew M. Falik
*Attorney, Agent, or Firm*—Fisher, Christen & Sabol

[57] ABSTRACT

A method and a machine for making a hollow fiber reinforcing member using a mandrel. A plurality of flexible rods are distributed around the periphery of the mandrel. Each rod is provided at one extremity with a respective curved end so that at least the extremities with bent ends are pressed against the mandrel, with their bent ends projecting outwards from the mandrel. At least one continuous strand of filaments is interlaced around the bent ends of the rods. As the strand of filaments is interlaced around the bent ends, the rods are displaced along the mandrel to disengage the already-interlaced strand of filaments from the bent ends of the rods such that a tracery of filaments including the rods and bearing against the mandrel is formed progressively.

19 Claims, 7 Drawing Sheets

METHOD AND A MACHINE FOR MAKING HOLLOW REINFORCING MEMBERS

Continuation-in-part of Ser. No. 07/951,829, filed on Sep. 28, 1992, abandoned.

BACKGROUND OF THE INVENTION

1. Field Of The Invention

The present invention relates to a method and a machine for making hollow reinforcing members formed by fibers distributed in three dimensions. It also relates to reinforcing members made in this way, and to composite parts obtained by using said reinforcing members impregnated with a settable binder.

2. Background Art

Methods of making such reinforcing members are already known which consist of in winding a two-dimension substrate onto a mandrel with said fibers being distributed in the substrate in at least two directions, with the third fiber dimension being added by needling said substrate. Such methods are described, for example, in U.S. Pat. Nos. 2,283,802, 3,322,868, 4,080,915 and 4,863,660. They suffer from drawbacks due essentially to the presence of the mandrel used during needling.

For example, in U.S. Pat. No. 4,080,915 where the support is rigid, provision is made for it to have openings so as to enable the point of the needle to penetrate therein without breaking. It will be observed that such a solution puts a severe constraint on needling options since the number of openings formed in the support is necessarily limited and it is essential for said needle to aim at such an opening on each stitch. Thus, in this prior patent, provision is made for the openings to be elongated slots, and for the lines of stitching to be rectilinear and in correspondence with said slots. It can thus be seen that not only must the density of stitches over the substrate be small, but also that the shapes of the lines of stitches and the distribution of the stitches are defined once and for all by said openings.

In contrast, in U.S. Pat. No. 4,863,660, provision is made for the support to be of a foam material or the like, thereby enabling the point of the needle to penetrate therein. Under such circumstances, there is no longer any limitation on stitch density or on the shapes of lines of stitching; however, it is then necessary for the support to be made of a material that is easily destroyed so as to enable the substrate to be disengaged from said support.

Methods of making hollow reinforcing members from fibers are also known in which a mandrel is not required; the methods consist of in weaving fibers around rods or sticks which form an array. Such weaving methods are described, for example, in French Patent Nos. 2,395,340, 2,529,589 and 2,531,459. Under such circumstances, the machines built for implementing such methods are complex and expensive. In addition, the kind of weave obtained is determined by said array of rods.

BROAD DESCRIPTION OF THE INVENTION

An object of the present invention is to remedy the drawbacks of the two known types of methods and to enable hollow fiber reinforcing members to be made by means of a simple machine, with the resulting weave being capable of being of any desired type. In addition, the invention makes it possible to use a mandrel without any difficulty of implementation and without limiting the kinds of weave available.

To this end, the present invention provides a method of making a hollow fiber reinforcing member by means of a mandrel, the method being remarkable in that:

a plurality of flexible rods are distributed around the periphery of said mandrel, each rod is provided at one extremity with a respective bent end so that at least said extremities with bent ends are pressed against said mandrel, with their bent ends projecting outwards from said mandrel;

at least one continuous strand of filaments is interlaced-around the bent ends of said rods; and as said strand of filaments is interlaced-around said bent ends, said rods are displaced along said mandrel to disengage the already-interlaced strand of filaments from said bent ends of said rods such that a tracery of filaments which includes said rods and which bears against said mandrel is formed progressively.

Thus, in the method of the present invention, said mandrel serves solely as a support for said bent ends to determine the positions thereof in three dimensions and thus to determine the shape of the reinforcing member obtained by interlacing the strand of filaments about said bent ends. There is no interference between the strand of filaments and the mandrel, other than that of the mandrel serving as a backing support for the weaving. The above-outlined drawbacks of known methods using a mandrel are thus avoided. In addition, the kind of weave obtained results solely from the disposition of the rods on the mandrel and the way in which the continuous strand(s) of filaments is/are interlaced around said bent ends. It will readily be understood that a large number of kinds of interlacing can be selected at will, thereby obtaining different weaves.

Depending on the kind of weave that is desired, said flexible rods may be disposed at the periphery of the mandrel in such a manner that their bent ends are all at the same position along the axis of said mandrel, or else they may be staggered along said axis. For example, provision may be made for said plurality of flexible rods to be made up of several sets of rods, with the bent ends of one set all being at the same position along the axis of said mandrel, but with each of said sets having the bent ends of its rods at a position that differs from the position of the other set or from each other set. It can thus be seen that the kind of weave may be varied over a wide range, particularly since it is possible to select at will the number of continuous strands of filaments that are interlaced.

For example, the rods of several of said sets of rods having staggered bent ends may form radial groups in which said rods are radially superposed. These groups of radially superposed rods may include different numbers of superposed rods in alternation around the periphery of said mandrel. In addition, peripherally consecutive groups of rods may be offset radially, e.g., in such a manner that in two peripherally consecutive groups, the rods in the less numerous group are radially disposed between pairs of rods in the more numerous group.

The said flexible rods may be made of a substance [e.g., the same substance as the interlaced strand(s) of filaments] which enable them to be held in place in the reinforcing member made in this way after it has been removed from said mandrel, thereby constituting the warp threads of said reinforcing member. Otherwise, said flexible rods may be made of a substance (e.g., a metal) such that it is necessary for them to be replaced by fibers of an appropriate kind. Under such circumstances, it is advantageous to use said flexible rods for pulling said replacement fibers through the reinforcing member when the rods are separated from said reinforcing member, prior to removing said member from the mandrel.

Although the mandrel may be stationary, with the filaments being interlaced over said bent ends by being displaced around said mandrel, it is advantageous for the mandrel to be rotary so that the strand(s) of filaments is/are interlaced as a result of said mandrel rotating.

In order to simplify implementation of the invention, it is advantageous to provide an abutment surface for the extremities of the rods opposite to said bent ends, and also to displace said mandrel towards said abutment surface progressively as the strand of filaments is being interlaced.

Thus, said rods which are secured to said mandrel during said displacement because of the pressure exerted by the already interlaced strand of filaments come into abutment against said abutment surface via their extremities opposite to their bent ends, thereby constraining them to slide relative to the mandrel and to the interlacing that is already formed, thus disengaging said bent ends therefrom so as to enable said interlacing to be continued.

The present invention also provides a machine for making a hollow fiber reinforcing member by means of a mandrel, the machine being remarkable in that it comprises:

a plurality of flexible rods each provided at one extremity with a bent end, the rods being distributed around the periphery of said mandrel, at least said extremities with bent ends being disposed against said mandrel with their bent ends projecting outwardly;

means for interlacing at least one continuous strand of filaments around the bent ends of said rods; and means for displacing said rods along said mandrel as said strand of filaments is being interlaced.

Preferably, said means for interlacing said continuous strand of filaments comprises means for rotating said mandrel about its axis, and non-rotating means for putting said strand of filaments down on said rotary mandrel around said bent ends of the rods.

The axis of rotation of said mandrel may be vertical.

In an advantageous embodiment of the present invention, said means for displacing said rods along the mandrel as said strand of filaments is being interlaced comprises an abutment surface for the extremities of said rods opposite to said bent ends and means for displacing said mandrel towards said abutment surface while said strand of filaments is being interlaced.

To facilitate displacement of the rods along the mandrel, the said abutment surface is advantageously in the form of a ramp that rises progressively in the direction of rotation of the mandrel. In order to further facilitate displacement of said rods, said ramp may be reciprocated so as to communicate reciprocatory motion thereto in the lengthwise direction of said rods.

In an embodiment of the machine of the present invention, said means for rotating said mandrel about its axis, and said means for displacing said mandrel towards said abutment surface comprise an actuator which is rotated about its own axis.

In a variant, said means for rotating said mandrel about its axis and said means for displacing said mandrel towards said abutment surface comprise a disk mounted to rotate relative to a plate suitable for being displaced parallel to its plane.

As mentioned above, said plurality of flexible rods may be made up of several sets of rods, with the bent ends of the rods in a set all being at the same position along the axis of said mandrel, but with each of said sets having the bent ends of its rods at a position that is different from the positions of the other sets. Under such circumstances, it is advantageous for the machine to include a plurality of thread-guides, each of which is suitable for placing a continuous strand of filaments on said mandrel around the bent ends of said rods. All of the thread-guides are then preferably mechanically secured to one another.

Advantageously, said non-rotary means for putting the strand of filaments down on the rotary mandrel comprise a head which includes a sensor which measures the distance between said head and said mandrel, a sensor which detects the peripheral travel of said rods, and a sensor which detects said bent ends of the rods. The information delivered by such sensors makes it possible to control the machine of the invention by means of a programmable controller.

Preferably, said head includes at least one thread-guide together with means for displacing said thread-guide parallel to said rods. It is thus possible to pass said strand of filaments over or under said bent ends at will. Advantageously, said head is pointable.

The invention includes a machine for weaving a hollow fiber reinforcing member by means of a mandrel, wherein the machine comprises:

a plurality of flexible rods, each having a straight shank portion, and each is provided at one extremity with a bent end wherein said bent end is substantially linear and occupies a plane which forms an angle of not less than 90° with said flexible rod, said angle facing the non-bent end of said flexible rod, the flexible rods being distributed around the periphery of said mandrel, at least said extremities with bent ends being disposed against said mandrel with their bent ends projecting outwardly;

means for interlocking at least one continuous strand of filaments around the bent ends of said flexible rods, said means for interlocking said continuous strand of filaments comprising means for rotating said mandrel about its axis, and non-rotating means for placing said strand of filaments around said bent ends of the rods; and means for displacing said flexible rods along said mandrel as said strand of filaments is being interlocked, said means for displacing said rods along the mandrel as said strand of filaments is being interlocked comprising an abutment surface for the extremities of said rods opposite to said bent ends and means for displacing said mandrel towards said abutment surface while said strand of filaments is being interlocked.

The invention further includes a method of weaving a hollow fiber reinforcing member by means of a mandrel, comprising the steps of:

distributing a plurality of flexible rods around the periphery of said mandrel;

providing each rod with a shank and at one extremity thereof with a bent end;

arranging said rods around said mandrel so that said rods are pressed thereagainst with their bent ends projecting outwardly therefrom;

forming a weft by depositing at least one continuous strand of filaments on said bent ends, in such a way that said continuous strand of filaments is caused to pass over come of said bent ends and under the other bent ends, and repeatedly, in a succession, depositing said at least one continuous strand of filaments on said bent ends, in such a way that said at least one continuous strand of filaments is caused to pass over some of bent ends and under the other bent ends for progressively forming a tracery of filaments along said shanks; and displacing and removing said rods along said mandrel as said strand of filaments is deposited on said bent ends, for disengaging the already-made tracery of filaments from said bent ends of rods for insertion of warp filaments through said displaced positions.

BRIEF DESCRIPTION OF THE DRAWINGS

Embodiments of the invention are described by way of example with reference to the accompanying drawings, in which.

DETAILED DESCRIPTION OF THE INVENTION

Figure 1:
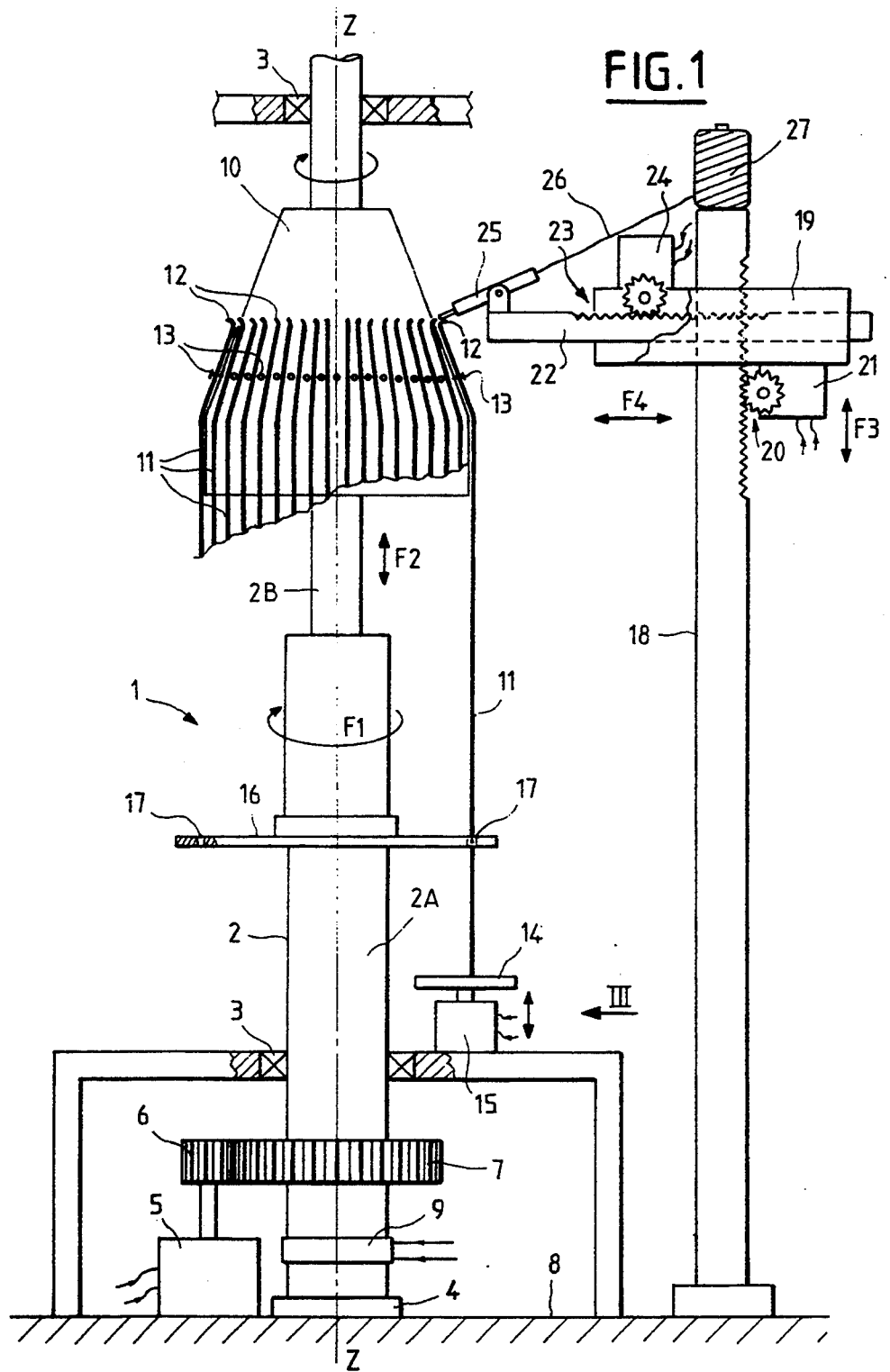
FIG. 1 is a diagram of a first embodiment of the machine of the present invention.

The embodiment of 1 of the machine of the present invention as shown in FIG. 1 comprises an actuator 2, e.g., an electrically-operated actuator, which has an axis Z—Z that extends vertically. The actuator 2 is mounted to rotate about said vertical axis Z—Z by means of bearings 3 and a ball abutment 4, and it is suitable for being rotated about said axis (see arrow F1) by a motor 5, e.g., an electric motor, that rotates a gear wheel 6 meshing with a toothed ring 7 disposed coaxially about the axis Z—Z and secured to the cylinder 2A of the actuator 2. Said cylinder 2A stands on the ground 8 via the ball abutment 4 and the rod 2B of said actuator 2 points upwards. The actuator 2 is powered by means of slip rings 9. When powered, the actuator 2 provides the option of retracting its rod 2B downwards or of pushing it upwards, as represented by double headed arrow F2.

A mandrel 10 is mounted on the rod 2B of the actuator 2. The outside shape of the mandrel corresponds to the inside shape of the hollow fiber reinforcing member that is to be made. The mandrel 10 is disposed coaxially about the axis Z—Z. In FIG. 1, the mandrel is a body of revolution comprising a cylindrical portion and a tapering portion. As appears from the description below, the present invention can be implemented by using mandrels of different shapes, including shapes that are not bodies of revolution.

A plurality of rods 11 are disposed around the periphery of the mandrel 10. The rods are flexible transversely but stiff longitudinally, and they are provided at their top extremities with respective bent ends 12. In a manner explained below, the rods 11 are kept pressed against the mandrel 10. In the example shown in FIG. 1, each rod 11 is disposed in an axial plane of the mandrel. Each rod 11 is capable of sliding relative to the mandrel 10. The rods 11 may be kept peripherally spaced apart from one another on said mandrel by means of spacers 13, e.g., nails or the like disposed in said mandrel.

Each rod 11 extends downwards so as to enable its bottom extremity to come into contact with a reciprocating blade 14 which is caused to reciprocate by an electrical reciprocator 15. To guide the bottom portions of the rods 11 and to constrain them to remain in their respective positions, a disk 16 is provided that is constrained to rotate with the actuator 2 and that is provided with individual holes 17 in its periphery, with each hole having a rod 11 passing therethrough.

The set of rods 11 thus forms an envelope surrounding the mandrel 10 and the actuator 2.

In order to clarify the drawing, the bottom portions of all of the rods 11 are cut off in FIG. 1 except for one of them. In addition, for convenience in explanation and in the drawing, FIG. 1 shows the machine at an advanced stage of weaving without showing the resulting weave. This will appear clearly on reading the description of FIGS. 4A to 4D.

Furthermore, the machine 1 of FIG. 1 includes a vertical column which has a carriage 19 mounted at the top thereof and is suitable for sliding along said column (arrow F3), e.g., by means of a rack-and-pinion device 20 driven by a motor 21 carried by said carriage 19.

The carriage 19 also carries a horizontal arm 22 suitable for sliding relative to said carriage 19 (arrow F4), for example, likewise by means of a rack-and-pinion device 23 driven by a motor 24 carried by said carriage 19.

The end of the horizontal arm 22 which faces the mandrel 10 carries a thread-guide 25 which is preferably pointable, and through which a strand of filaments 26 passes, the strand being played out freely from a reel 27, e.g., carried by the column 18.

The actuator 2, the motors 5, 21 and 24, and the reciprocator 15 are powered from one or more power supplies (not shown). Naturally, these various members may be controlled by means of a centralized device, such as a programmable controller or a computer (also not shown).

Figure 2:
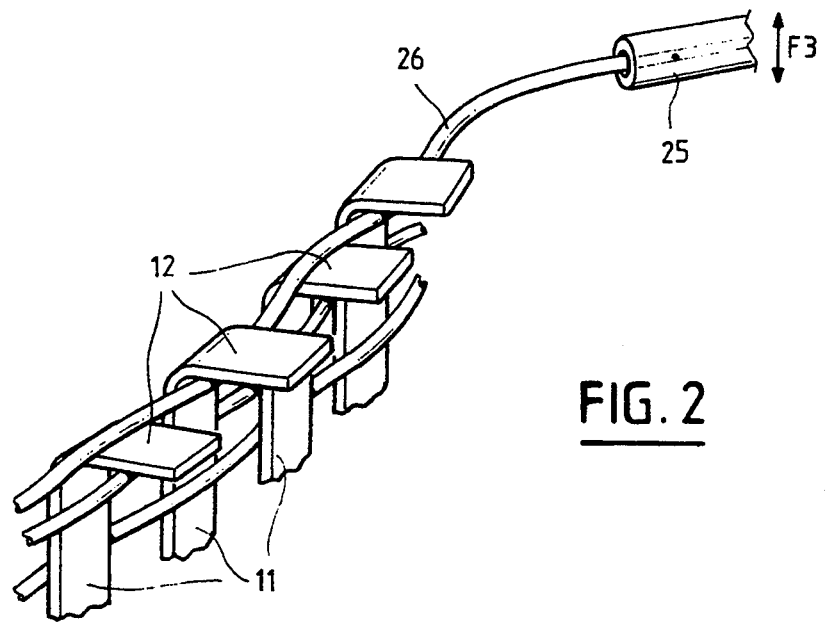
FIG. 2 is a perspective view showing one kind of weave that can be obtained by implementing the machine of FIG. 1.

As shown in FIG. 2, the motors 21 and 24 are controlled to move the thread-guide 25 past the bent ends 12 of the rods 11, with said thread-guide being pointed appropriately. With the actuator 2 being rotated about the axis Z—Z by the drive means 5, 6 and 7, said bent ends 12 move past the front of the thread-guide 25. The thread-guide is driven with vertical reciprocating motion (arrow F3) under the control of the motor 21, thereby enabling the strand of filaments 26 to be caused to pass over or under said bent ends 12 while the strand is being applied to the mandrel 10. In FIG. 2, it is assumed that the strand of filaments passes alternatively over and under said bent ends 12.

Figure 4A:
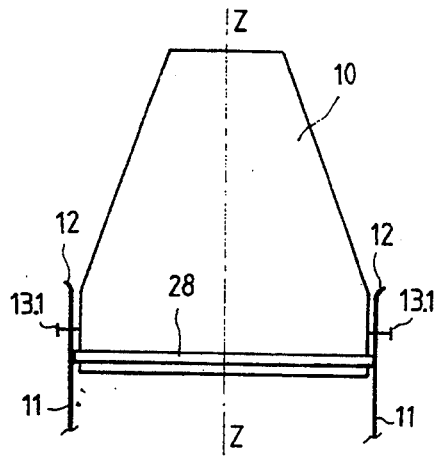
FIGS. 4A, 4B, 4C and 4D show four steps of the method of the present invention.

Before beginning weaving as shown in FIG. 2, the mandrel 10 and the rods 11 are prepared, e.g., in the manner shown in FIG. 4A. In FIG. 4A, it is assumed that all of the rods 11 are identical and that all of their bent ends 12 are initially all at the same horizontal level relative to the axis Z—Z. The top extremities of the rods 11 are kept pressed against the mandrel 10 by a resilient strap 28 that surrounds them. In addition, a first set 13.1 of spacers 13 is disposed in the vicinity of the bent ends 12.

The strand of filaments 26 is then pulled from the thread-guide and its free end is fixed to the mandrel, e.g., at one of the spacers 13 in the set 13.1. Thereafter, weaving is begun as explained with reference to FIG. 2.

Figure 3:
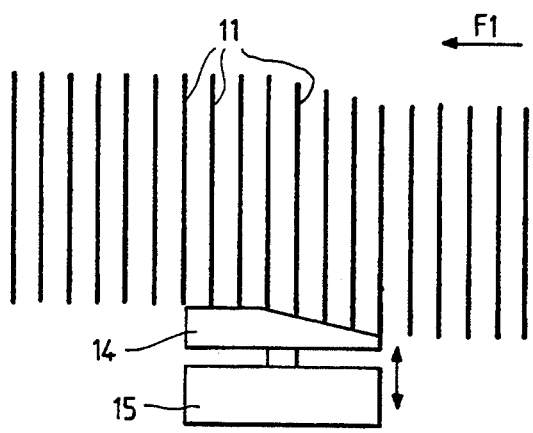
FIG. 3 is a detail view of the FIG. 1 machine as seen on arrow III of FIG. 1.

As the strand of filaments 26 is interlaced around the bent ends 12, the actuator 2 is controlled (via the slip rings 9) to retract by rod 2B. This causes the mandrel 10 to move downwards. Since the rods 11 are held against the mandrel 10 by the resilient strap 28 and by the already-interlaced turns of the strand of filaments 26, the rods 11 are caused to move down with the said mandrel 10. However, as they move downwards, the bottom extremities of the rods 11 come into contact with the reciprocating blade 14 which causes the rods 11 to move upwards so that they slide relative to the mandrel and relative to the already-interlaced turns of the strand of filaments 26. As can be seen in FIG. 3, the reciprocating blade 14 has a ramp-shaped profile disposed peripherally to the set of rods 11, thereby facilitating upwards displacement of the rods 11. Referring to FIG. 2, as the rods 11 move upward, where the strand of the filaments 26 passes over the bent ends 12 of the rods 11, the strand of the filaments 26 slides over the rounded interface between rods 11 and bent ends 12 to be positioned on the side of rods 11 facing mandrel 10. Thus, said turns of the strand of filaments 26 slide downwards relative to the rods 11 while the bent ends of the rods remain free to receive further interlacing of the strand of filaments 26. The mandrel 10 moves down along the axis Z—Z and the turns of the strand of filaments 26 move downwards along the rods 11 continuously while the strand of filaments 26 is being interlaced over the bent ends 12.

A weave 29 constituted by a tracery of filaments including the rods 11 and bearing against the mandrel 10 is thus built up progressively.

Reference is made to FIG. 2. Thread-guide 3 moves up and down (see arrow 3) perpendicularly to the plan in which bent ends 12 of rods 11 are located. This perpendicular motion positions filament 26 so as to be located above or below the bent end 12 being rotated into position.

A "passive function" is present. In fact, the strand of filaments is deposited on said bent ends, in such a way that said continuous strand of filaments is caused to pass over some of said bent ends and under the other bent ends for progressively forming a tracery of filaments including said rods and bearing against said mandrel. It is obvious that, if the rods were not passive, but active (like needles), the tracery of filaments would not include the rods and the strand would not be deposited on the bent ends for passing over and under the bent ends to progressively form the tracery. Active needles (and not rods) would be outside of said tracery, only each of their hooks contacting the tracery for weaving it. In such case, the strand would not be "deposited" but hooked by the active needles.

Figure 4B:
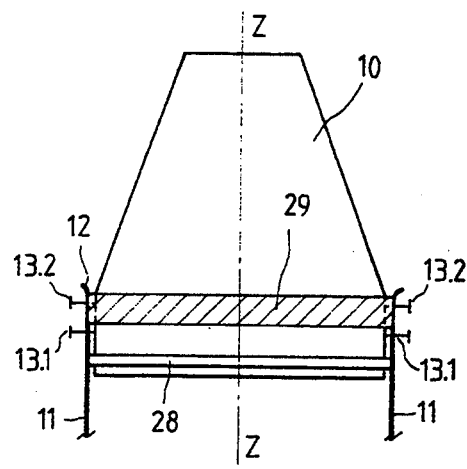
Figure 4C:
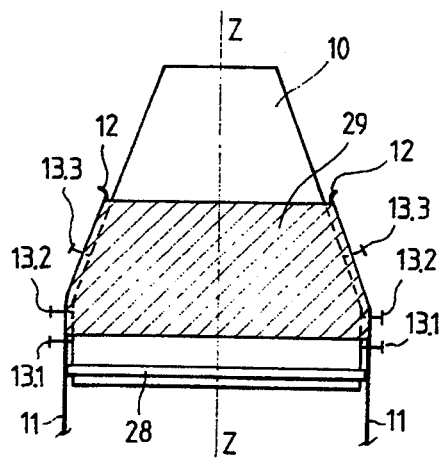
Figure 4D:
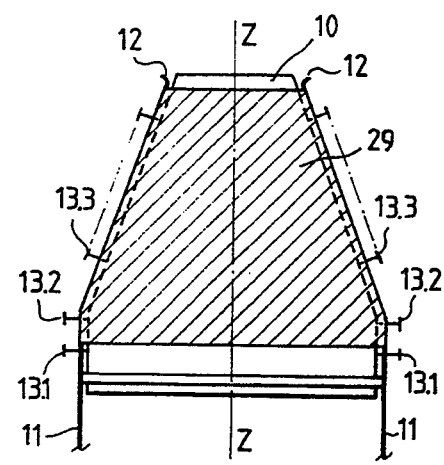

FIG. 4B, 4C and 4D show three different states of such weaving. It can be seen that during said weaving, successive sets 13.2, 13.3, . . . , of spacers 13 are installed from place to place for the purpose of guiding the top extremities of the rods 11 as they slide along the mandrel 10. It may be observed that the spacers 13 in the different sets 13.1, 13.2, 13.3, . . . also serve to provide vertical supports for the turns of said weave 29.

Referring specifically to FIGS. 4B and 4C, rods 11 are made of a flexible matter so that each flexible rod 11 is bent inward over the mandrel rim as the mandrel 10 turns and the rods 11 advance, under the pressure applied by wound strand 26.

Figure 5:
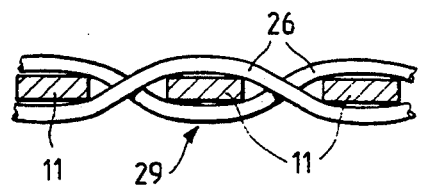
FIG. 5 shows said weave in a plane orthogonal to the rods, with the weave being shown rolled out flat.

As shown in FIG. 5, the resulting weave 29 is such that the rods 11 constitute the warp threads, while the turns of the strand of filaments 26 form the weft threads.

The rods 11 may be made of a substance which enable them to be kept in place in the weave 29 as a component thereof after the weave 29 has been separated from the mandrel 10. For example, the strand of filaments 26 and the rods 11 may be constituted by fibers made of glass, or silica, or carbon, or silicon carbide, or alumina, etc . . .

Figure 6:
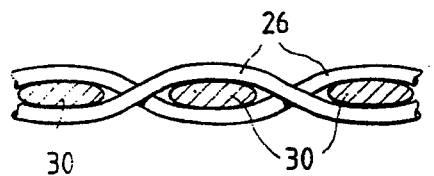
FIG. 6 is a view analogous to FIG. 5 showing the resulting fabric.

Alternatively, the rods 11 may be made of a substance, e.g., a metal, that cannot form a portion of the final reinforcing member. Under such circumstances, it is necessary for each rod 11 to be replaced by a strand 30 of suitable fibers. This can be achieved simply by fixing such strands of fibers to the bottom extremities of said rods, and then pulling the rods through the turns of the strand of filaments 26 prior to removing the mandrel 10. It is thus possible simultaneously to remove the rods 11 and to replace them with fiber strands 30. FIG. 6 shows a weave 29 provided with such fiber strands 30.

After the mandrel 10 has been removed, the reinforcing member 29 may be subjected to all the usual operations of impregnation by means of a binder, of polymerization, of densification, etc . . . suitable for enabling said reinforcing member to form a desired rigid composite part.

Figure 7:
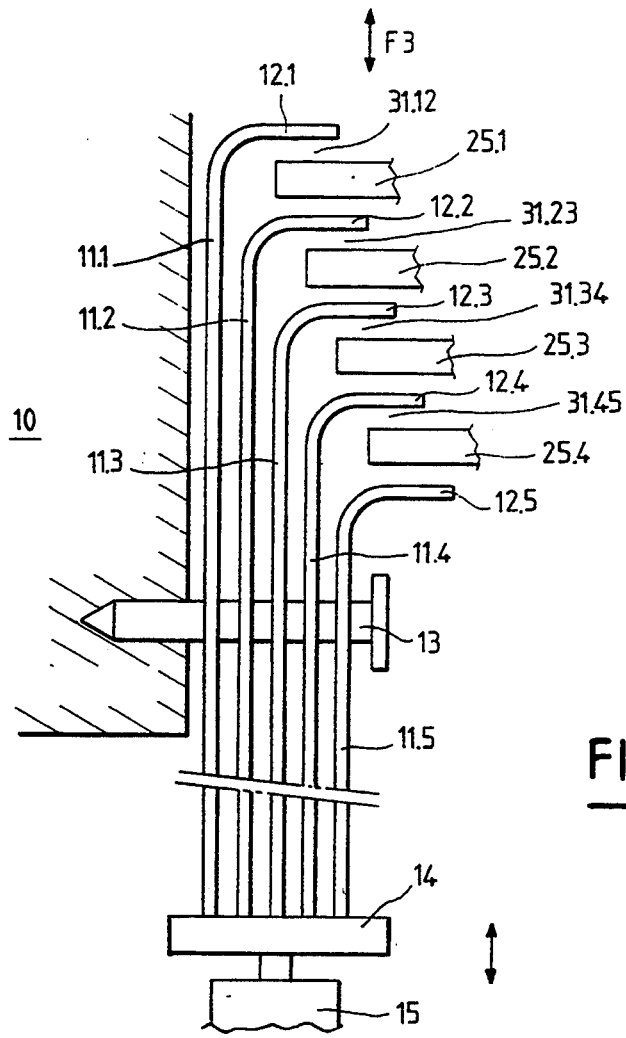
FIG. 7 shows a variant disposition for the flexible rods on the mandrel in association with a plurality of thread-guides.

In the embodiment of the invention described above, all of the rods 11 are assumed to be identical. In contrast, in a variant embodiment shown diagrammatically in FIG. 7, rods 11 of different lengths are provided in a plurality of sets 11.i (where i=1, 2, 3, 4 and 5 in the figure). Each of said sets comprises a plurality of identical rods 11 (like the plurality of rods 11 in FIGS. 1 to 5), but the rods in each set are different in length from the rods in at least one other set.

The bottom extremities of all of the rods in all of the sets 11.i lie substantially in the same horizontal plane so as to enable them to be raised by the reciprocating blade 14 (in the manner described above for the rods 11). The longest rods 11.1 make direct contact with the mandrel 10. The rods 11.2 of length immediately shorter than the rods 11.1 overlie the rods 11.1 on their sides facing away from the mandrel, in such a manner that the bent ends 12.1 of the rods 11.1 and the bent ends 12.2 of the rods 11.2 leave open gaps 31.12 that face outwards. In identical manner, the bent ends 12.3, 12.4, and 12.5 of successively shorter rods 11.3, 11.4 and 11.5 cooperate in pairs to form respective gaps 31.23, 3.34, and 31.45 similar to the gaps 31.12 and all open outwardly.

It is thus possible to put down a plurality of strands of filaments 26 (not shown in FIG. 6) simultaneously, with each strand coming from a corresponding thread-guide 25.1 to 25.4. As explained below, it is advantageous for the thread-guides 25.1 to 25.4 to be mutually fixed relative to one another.

With reference to the description above, it will easily be understood that the strands of filaments 26 form turns around the mandrel 10 that are capable of passing between the mandrel 10 and the rods 11.1, or between any two rods in a pair of adjacent sets 11.1 to 11.5.

It is thus possible to obtain weaves of multiple thicknesses.

Figure 8:
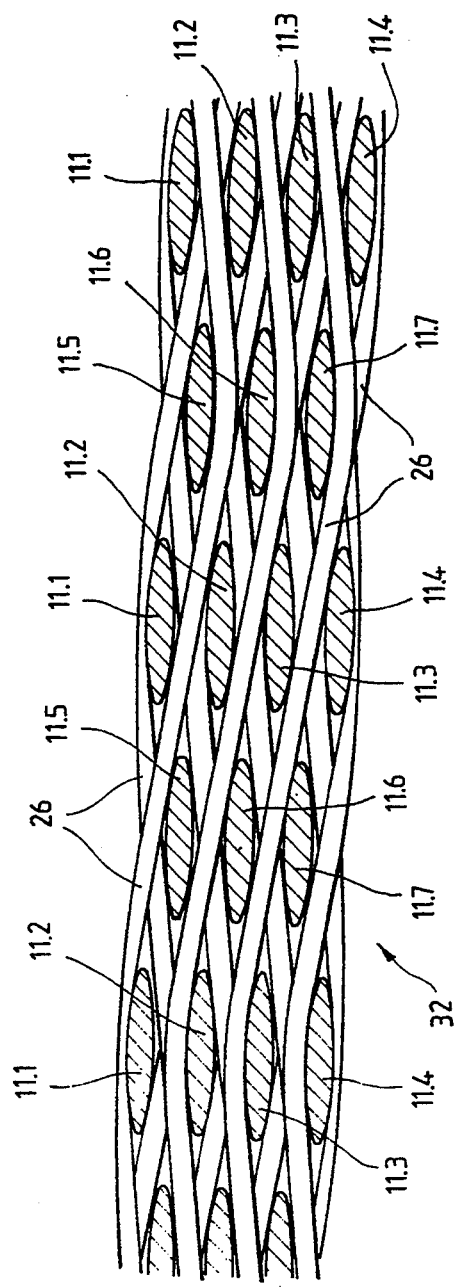
FIG. 8 is a rolled-out section through a weave that can be obtained by using the device of FIG. 7.

In addition, as shown in FIG. 8, it is possible to vary the number i of sets of rods 11 in alternation around the periphery of the mandrel 10, and to offset two consecutive groups of rods 11 relative to each other. FIG. 87 shows a reinforcing pattern described in French Patent No. 2,610,951.

To obtain the weave 32 of FIG. 8, seven sets of rods 11 are used having respective references 11.1 to 11.7.

The sets of rods 11.1 to 11.4 constitute four-rod sets disposed in the manner shown in FIG. 6. Similarly, the sets of rods 11.5 to 11.7 form three-rod sets likewise disposed as shown in FIG. 6. In addition, the groups of four rods 11.1 to 11.4 and the groups of three rods 11.5 to 11.7 alternate around the periphery of the mandrel and are radially offset relative to each other so that the radial positions of the rods 11.5, 11.6 and 11.7 lie between the following pairs of rods respectively: 11.1 and 11.2; 11.2 and 11.3; and 11.3 and 11.4.

In FIG. 8, the sections of the rods 11.1 to 11.7 are identical in outline to the strands of threads that are to replace them (identical to the threads 30).

Figure 9:
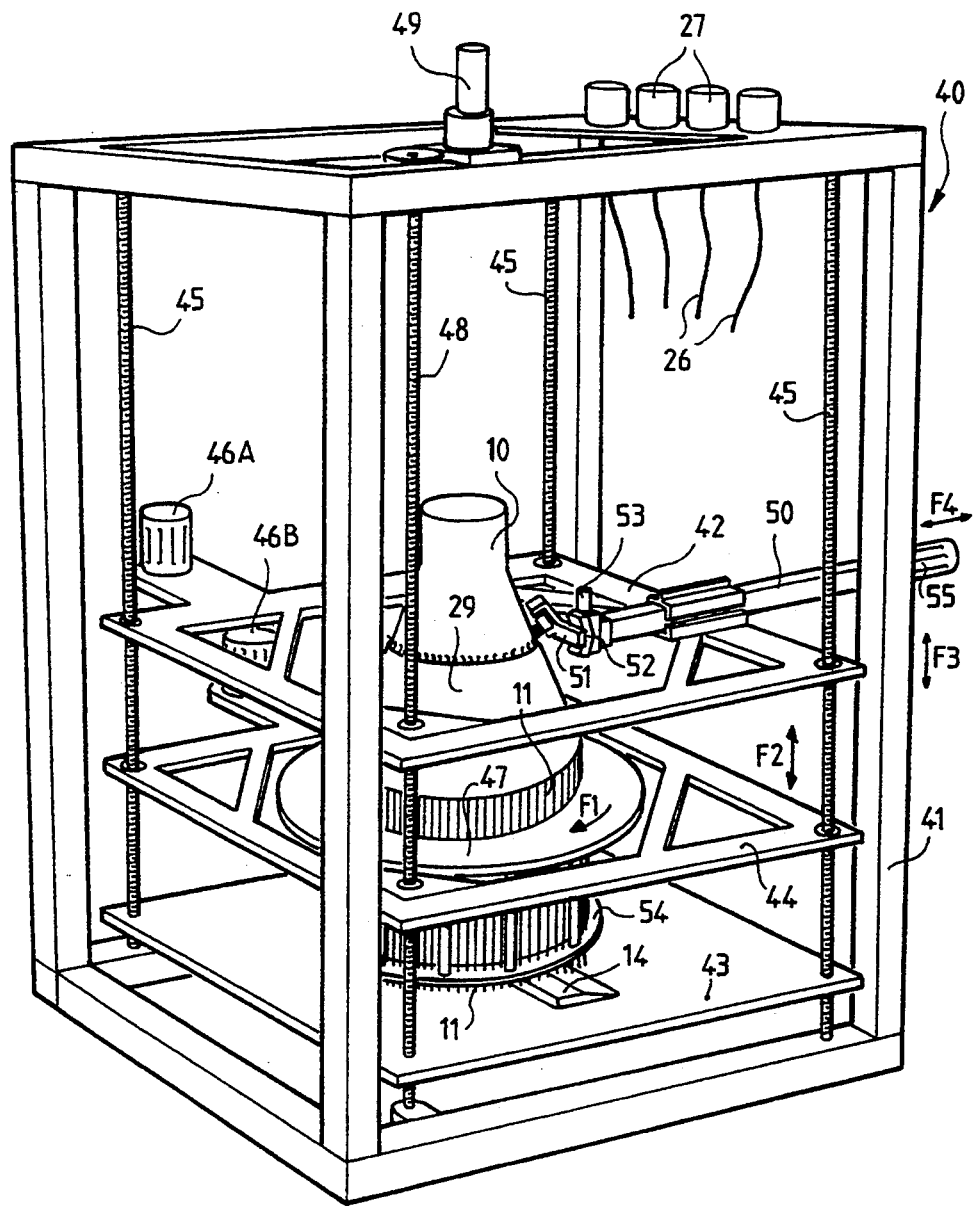
FIG. 9 is a perspective view which shows a variant embodiment of the machine of the present invention.

The variant embodiment 40 of the machine of the invention as shown in FIG. 9 includes a cage-shaped frame 41 which has two extreme plates 42 and 43 mounted therein together with an intermediate plate 44. The bottom extreme plate is fixed on fixed threaded columns 45 secured to the frame 41, while the top extreme plate 42 and the intermediate plate 44 are capable of sliding along said threaded columns 45 under drive from respective motors 46A and 46B carried by said plates and driving nuts mounted rotatably thereon (said nuts not being visible in the figure since they are incorporated in the plates 42 and 44). For example, the motors 46A and 46B may use respective gear wheels to drive respective closed-loop chains that mesh with the driving gear wheels and that in turn serve to rotate said nuts.

In addition, the moving intermediate plate 44 carries a disk 47 mounted (in any conventional manner not shown) to be capable of rotating in its own plane relative to said moving intermediate plate 44. The disk 47 is rotated by means of a shaft 48, itself rotated by a motor system 49 disposed on the top portion of the frame 41.

An arm 50 (equivalent to the arm 22) is mounted on the top plate 42 and it carries a head 51 for putting down strands of filament at its free end pointing towards the inside of the frame 41, said head being connected to said arm by means of a ball joint 52. The head 51 can be pointed by a motor 53 that controls the ball joint 52.

The rotary disk 47 carries the mandrel 10 which is fitted with the rods 11. The bottom extremities of the rods are close to the bottom plate 43 on which the reciprocating blade 14 is disposed.

One or more disks 54 similar to the disk 16 for guiding the bottom extremities of the rods 11 rotate synchronously with the rotary disk 47.

Reels of strands of filaments 27 are disposed at the top of the frame 41 to feed the head 51 with the strands of filaments 26.

It can thus be seen that the displacements corresponding to arrows F1, F2, and F3 described with reference to FIG. 1 are performed respectively by rotating the disk 47, by moving the disk in translation (synchronously with the intermediate plate 44) along the threaded columns 45, and by moving said top plate 42 in translation along said columns. The displacement of the arm 50 corresponding to arrow F4 is obtained by controlling a motor 55.

Figure 10:
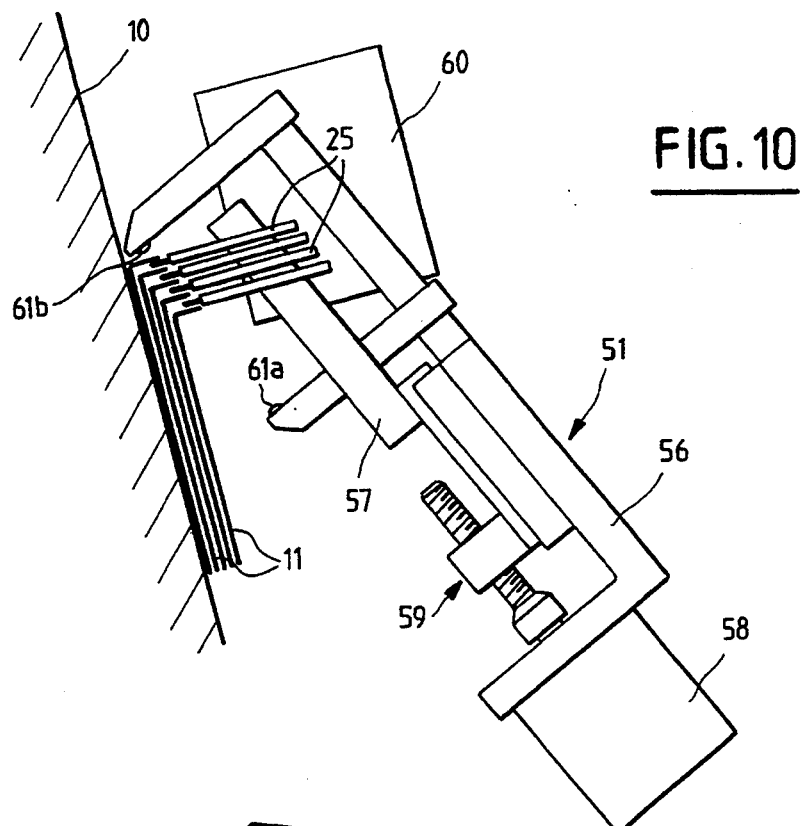
FIGS. 10 and 11 are, respectively, a side view and a perspective view of a head for putting down a strand of filaments in a machine of the present invention.
Figure 11:
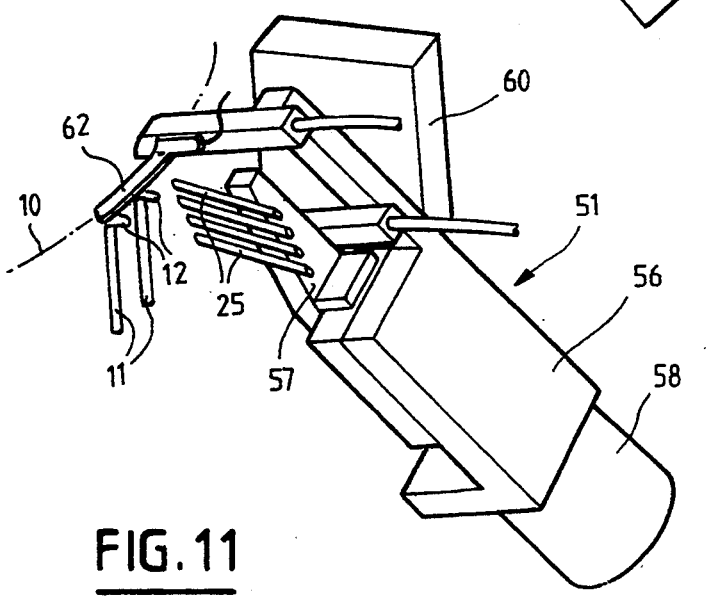

As shown in FIGS. 10 and 11, the head 51 comprises a frame 56 connected to the ball joint 52. The frame 56 has a slide 57 mounted thereon and suitable for being actuated by a motor 58 via a transmission 59. The moving portion of the slide carries a plurality of thread-guides 25, each suitable for being continuously fed with a strand of filaments 26 from a reel 27.

It can thus be seen that by controlling the motor 58 it is possible to adjust the height of the thread-guides 25 quickly and minutely relative to the bent ends 12 in the direction of arrow F3.

In addition, the frame 56 of the head 51 carries a sensor 60 for measuring the distance between said head 51 and the mandrel 10, respective sensors 61a and 61b for detecting the passage of radial groups of rods 11, and a feeler 62 for detecting the bent ends 12.

It will thus easily be understood that a programmable controller can control the various motors 46A, 46B, 53, 55 and 58 as a function of the information provided by the sensors 60 and 61a-61b, and by the feeler 62, to cause the machine 40 to perform a desired method of weaving, once the mandrel 10 has been caused to rotate and the reciprocating ramp 14 has been activated.

What is claimed is:

1. A method of weaving a hollow reinforcing member formed by fibers by means of a mandrel having a periphery and an axis, comprising the steps of:
   (a) distributing a plurality of flexible rods around the periphery of said mandrel;
   (b) providing each rod with a shank and at one extremity thereof with a bent end;
   (c) arranging said flexible rods around said mandrel so that said rods are pressed thereagainst with their bent ends projecting outwardly therefrom;
   (d) forming a weft by depositing at least one continuous strand of filaments on said bent ends, in such a way that said at least one continuous strand of filaments is caused to pass over some of said bent ends and under the other bent ends, and repeatedly, in a succession, depositing said at least one continuous strand of filaments on said bent ends in such a way that said at least one continuous strand of filaments is caused to pass over some of said bent ends and under the other bent ends for progressively forming a tracery of filaments along said shanks; and
   (e) displacing and removing said rods along said mandrel, as said at least one continuous strand of filaments is deposited on said bent ends, for disengaging the already-made tracery of filaments from said bent ends of said rods.

2. The method according to claim 1, further comprising the step of in the method, positioning the bent ends of said plurality of flexible rods so as to lie at the same position along the axis of said mandrel.

3. The method according to claim 1, further comprising the step of in the method, staggering the bent ends of said plurality of flexible rods along the axis of said mandrel.

4. The method according to claim 1, wherein said plurality of flexible rods comprises several sets of rods, and further comprising the step of, in the method, locating the bent ends of the rods in a set all so as to be at the same position along the axis of said mandrel, but locating each of the sets so as to have the bent ends of its rods at a position that differs from the positions of the other sets.

5. The method according to claim 2, 1, further comprising the step of, in the method, forming the flexible rods of several sets into radial groups in which said flexible rods are superposed radially.

6. The method according to claim 5, further comprising the step of in the method, positioning the groups of radially superposed rods, which comprise different numbers of superposed rods, in alternation around the periphery of said mandrel.

7. The method according to claim 6, further comprising the step of in the method, radially offsetting the rods of peripherally consecutive groups.

8. The method according to claim 7, further comprising the step of in the method, in two peripherally consecutive groups, radially disposing the rods of the less numerous group between pairs of rods of the more numerous group.

9. The method according to claim 1, further comprising the step of, during step (d), holding the flexible rods in place in order to form an integral portion of said reinforcing member.

10. The method according to claim 1, further comprising the step of in the method, rotating said mandrel about its axis.

11. The method according to claim 1, further comprising the steps of providing an abutment surface for the extremities of said rods opposite to said bent ends prior to step (a), and displacing said mandrel towards said abutment surface during step (d).

12. A machine for weaving a hollow reinforcing member formed by fibers by means of a mandrel having a periphery and an axis of rotating, the machine comprising:

(a) a plurality of flexible rods, each having a straight shank portion, and each being provided at one extremity with a bent end wherein said bent end is substantially linear and occupies a plane which forms an angle of not less that 90° with said flexible rod, said angle facing the non-bent end of said flexible rod, the flexible rods being distributed around the periphery of said mandrel, at least said extremities with bent ends being disposed against said mandrel with their bent ends projecting outwardly;

(b) means for interlocking at least one continuous strand of filaments around the bent ends of said flexible rods, said means for interlocking said continuous strand of filaments comprising means for rotating said mandrel about its axis, and non-rotating means for placing said strand of filaments around said bent ends of the rods; and (c) means for displacing said flexible rods along said mandrel as said strand of filaments is being interlocked, said means for displacing said rods along the mandrels as said strand of filaments is being interlocked comprising an abutment surface for the extremities of said rods opposite to said bent ends and means for displacing said mandrel towards said abutment surface while said strand of filaments is being interlocked.

13. The machine according to claim 12, wherein the axis of rotation of said mandrel is vertical.

14. The machine according to claim 12, wherein said means for rotating said mandrel about its axis together with said means for displacing said mandrel towards said abutment surface comprise an actuator, which is rotated about its own axis.

15. The machine according to claim 12, wherein said means for rotating said mandrel about its axis together with said means for displacing said mandrel towards said abutment surface comprise a disk mounted to rotate relative to a plate, said plate having a surface and said plate being adapted to be displaced in a direction perpendicular to said surface.

16. The machine according to claim 12, wherein said plurality of flexible rods is constituted of several sets of rods, the bent ends of the rods in a set all being at the same position along the axis of said mandrel, but each of said sets having the bent ends of its rods at a position which is different from the positions of the other sets, and wherein said machine includes a plurality of thread-guides, each of which is adapted for putting one of the at least one continuous strand of filaments down on said mandrel around the curved ends of said rods.

17. The machine according to claim 16 wherein said thread-guides are secured mechanically relative to one another.

18. The machine according to claim 12, wherein said non-rotating means for putting the strand of filaments down on the rotary mandrel comprise a head facing the mandrel including a sensor measuring the distance between said head and said mandrel, a sensor detecting the peripheral travel of said rods, and a sensor detecting said curved ends of the rods.

19. The machine according to claim 18, wherein said head includes at least one thread-guide together with means for displacing said thread-guide parallel to said rods.

* * * * *

UNITED STATES PATENT AND TRADEMARK OFFICE
CERTIFICATE OF CORRECTION

PATENT NO. : 5,390,707
DATED : Feb. 21, 1995
INVENTOR(S) : Cahuzac

It is certified that error appears in the above-identified patent and that said Letters Patent is hereby corrected as shown below:

On the title page, under

[73] Assignee: delete "Societe Nationale Industrielle et Aerospatiale" and insert --Aerospatiale Societe Nationale Industrielle--

Signed and Sealed this

Thirtieth Day of May, 1995

*Attest:*

BRUCE LEHMAN

*Attesting Officer*  *Commissioner of Patents and Trademarks*